Patented June 7, 1949

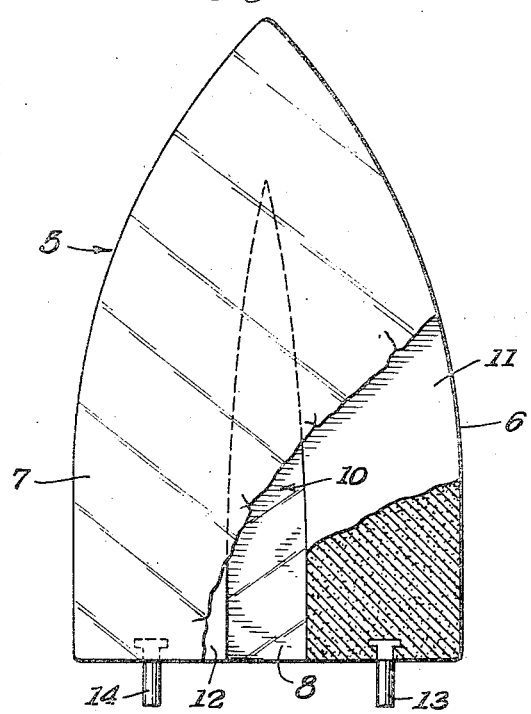
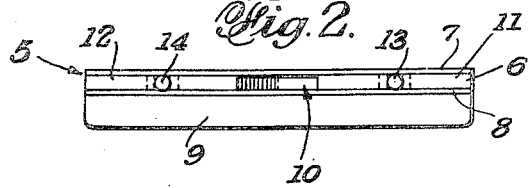
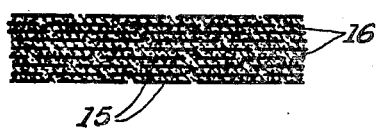

2,472,533

UNITED STATES PATENT OFFICE 2,472,533

MICA BASE HEATING SHEET

Moses D. Heyman, Woodmere, N. Y.

Application December 6, 1945, Serial No. 633,113

3 Claims. (Cl. 201—63)

This invention relates to mica base heating sheets which are adapted for various uses.

One object of the present invention is to provide a heating element which is simple, inexpensive to produce and highly effective for automatically controlling the temperature of a pressing iron or other analogous device.

Another object of the invention is to provide a heating element which will automatically respond to temperature changes by variations in its electrical resistance so as to control the temperature of a pressing iron or other heating device and more specifically to prevent the element from over-heating.

Another object of the invention is to provide a heating element in which the electrical resistance increases as the temperature of the element increases, the resistance being a function of the temperature.

Another object of the invention is to provide a heating element that will deliver a high volume of heat per unit of surface commensurate to the temperature delivered by the heat generator. The usual method of constructing a heating element is to wind an insulator with a piece of nickel-chromium wire. The electric current is such as to heat this wire to a temperature of about 1600° F. The number of British thermal units that such a wire or ribbon will generate depends upon the temperature multiplied by the area of the ribbon. Usually this area is about one-half of the total area of the element because of the necessary space between the convolutions of ribbon. By means of the present heating element, the entire surface will radiate heat. Thus, at only one-half the temperature of the heating element a commensurately high volume of heat will be delivered. This feature is important because conventional heating elements frequently fail because of the oxidation of the heated wire or ribbon. This oxidation is slight at low temperatures but very high when the temperature rises over 1000° F.

The invention also has for its objects to provide such means that are convenient in use, easily installed in operating position, and easily disconnected therefrom; economical to manufacture, relatively simple, and of general superiority and serviceability.

The invention also involves novel details of construction and novel combinations and arrangements of parts, which will appear more fully in the course of the following description. However, the drawing merely shows, and the following description merely describes one embodiment of the present invention, which is given by way of illustration or example.

In the drawing:

Fig. 1 is a top plan view, partly broken away and partly in section, of a heating element embodying this invention.

Fig. 2 is an end view thereof and shown in association with the heater plate of a pressing iron.

Fig. 3 is an enlarged fragmentary detail cross-sectional view of the heating element employed in the invention.

The embodiment of the invention which is illustrated, may be said to comprise, generally a heating element 5 consisting of a heating unit 6 and upper and lower heat insulating plates 7 and 8, respectively; and the heater plate 9 of a pressing iron.

The sheets 7 and 8 may be formed of various heat resistant material and are preferably made of pure mica or of integrated mica, such as set forth in my patent entitled "Integrated mica and method of making the same," No. 2,405,576, and dated August 13, 1946. If the sheets 7 and 8 are formed of integrated mica, their hygroscopic properties may be improved by a slight impregnation of an insulating resin or the like. The plate 9 is of conventional form and thickness for suitable application of heat as imparted by the heating element 5.

The heating unit 6 is shown as comprising a plate of integrated mica formed with a notch or recess 10 to provide the legs 11 and 12 whereby electric current may flow from one leg to the other between terminals 13 and 14 connected to the respective legs 11 and 12. By forming the unit 6 in this manner, or in any other suitable manner, the entire unit provides a path for the current and a short path between the terminals 13 and 14 is obviated. It will be evident that said unit 6 affords a means for the uniform application of heat to the heater plate 9.

The unit 6 is formed of a sheet or plate of integrated mica comprising mica flakes 15 arranged in laminated array in which the flakes lie in parallel planes and as illustrated in Fig. 3. The flake laminae of the plate are in firm contiguity and, when the plate is formed according to the method of the mentioned patent, a homogeneous mica structure is provided having, however, small pores, interstices or spaces among the flakes. According to the invention, these pores are filled with electrically conducting particles 16 by various impregnation methods. These particles may comprise colloidal graphite or metals which can be injected into the pores of the plate to provide a continuous, promiscuously arranged chain of particles having a known electrical resistance.

It will be apparent that the unit 6 above described will conduct electric current between the terminals 13 and 14 and, because of its electrical resistance, will become heated to create a temperature of an intensity related to said resistance. The unit, as shown in the end view Fig. 2, becomes a single operating unit because all of the elements 5, 6, 7, 8 and 10, are preferably cemented together so that they cannot readily be separated. The heater base 9, being made of metal, has a greater ratio or coefficient of expansion than the mica. Further, when the heating element reaches a certain temperature, its expansion will expand or stretch the integrated mica which in turn will tend to separate. The tiny particles of graphite or metal that form the conducting agent within the pores or interstices of unit 6, will be slightly separated, making electrical contact among the particles more tenuous. Consequently, the electrical resistance will be increased and the temperature of the heating element will drop. It follows then that the plate 9 cannot become overheated when suitable values are embodied in the unit 6 during manufacture.

The unit 6, in fact, comprises a heating unit which embodies its own thermostatic control resulting in extreme simplicity of construction with high efficiency of operation.

The arrangement of Fig. 2 is quite general and may be varied. For instance, the heating element 5 may be recessed into the plate 9 and sufficient insulation provided to obviate undue heating of the pressing iron body in ways common to the industry.

Likewise, another method of making the heating element is to impregnate the integrated mica with a hydrocarbon such as an oil. When the element is saturated, it is baked at a temperature above the carburizing point, with the result that deposits of carbon will remain resident in the interstices of the integrated mica sheet.

It is also understood that any porous nonconductor can be used instead of integrated mica. Such materials may be porous ceramics, sheets made of woven glass fibres, sheets made of asbestos fibres, etc.

While I have illustrated and described what I now consider as the preferred embodiment of my invention, the construction is, of course, subject to modifications without departing from the spirit and scope of the invention. I therefore, do not wish to restrict myself to the particular form of construction illustrated and described, but desire to avail myself of all modifications that may fall within the scope of the appended claims.

I claim:

1. A fabricated laminated mica sheet comprising extremely thin laminae having virgin surfaces, said laminae being arranged in random fashion whereby their surfaces are in contiguous relation and enabling the natural cohesive forces resident in the laminae to become effective, and whereby the laminated sheet differs from a natural mica sheet in that the laminae are relatively smaller and frequently lie in more than one plane with spaces formed between the contiguous edges of the laminae, and electrically conducting particles occupying said spaces.

2. A fabricated laminated mica sheet comprising extremely thin laminae having virgin surfaces, said laminae being arranged in random fashion whereby their surfaces are in contiguous relation and enabling the natural cohesive forces resident in the laminae to become effective, and whereby the laminated sheet differs from a natural mica sheet in that the laminae are relatively smaller and frequently lie in more than one plane with spaces formed between the contiguous edges of the laminae, and graphite particles occupying said spaces.

3. A heating element comprising a three-ply sheet consisting of an inner ply of fabricated laminated mica formed of extremely thin laminae having virgin surfaces, said laminae being arranged in random fashion whereby their surfaces are in contiguous relation and enabling the natural cohesive forces resident in the laminae to become effective, and whereby the laminated ply differs from a natural mica sheet in that the laminae are relatively smaller and frequently lie in more than one plane with spaces formed between the contiguous edges of the laminae, electrically conducting particles occupying said spaces, and outer plies of mica connected to the inner ply.

MOSES D. HEYMAN.

REFERENCES CITED

The following references are of record in the file of this patent:

UNITED STATES PATENTS

| Number | Name | Date |
| --- | --- | --- |
| 395,950 | Capek | Jan. 8, 1889 |
| 477,708 | Sigsbee | June 28, 1892 |
| 991,841 | Gardner | May 9, 1911 |
| 1,335,295 | Papini | Mar. 30, 1920 |
| 1,340,795 | Saucy et al. | May 18, 1920 |
| 1,663,810 | Morse | Mar. 27, 1928 |
| 1,701,386 | Mucher | Feb. 5, 1929 |
| 1,776,191 | Mucher | Sept. 16, 1930 |
| 1,929,396 | Benkelman | Oct. 3, 1933 |
| 2,405,576 | Heyman | Aug. 13, 1946 |